United States Patent Office 2,861,025
Patented Nov. 18, 1958

2,861,025

PROCESS FOR OBTAINING VITAMIN $B_{12}$ AND VITAMIN $B_{12}$-LIKE SUBSTANCES AND THE PRODUCTS THEREOF

Abraham L. Baron, Bloomfield, N. J., and Emil J. Maxion, Queens Village, N. Y., assignors to Chase Chemical Company, Newark, N. J., a corporation of New Jersey No Drawing. Application December 20, 1954
Serial No. 476,584

26 Claims. (Cl. 167—81)

This invention relates to a process for extracting vitamin $B_{12}$ and vitamin $B_{12}$-like substances from fermentation products, concentrates or other sources containing the same by precipitation with a hydroxybenzoic or hydroxynaphthoic acid compound as well as to the addition product so produced.

Vitamin $B_{12}$ is a chemical entity which can be produced in crystalline form with precise chemical and physical properties, but there are a number of closely related substances having essentially the same chemical and biological nature which are very similar to vitamin $B_{12}$ and have vitamin $B_{12}$ activity. There has been described in the technical literature vitamin $B_{12a}$, vitamin $B_{12b}$, vitamin $B_{12c}$, and others which have not been specifically designated, but all these substances, including vitamin $B_{12}$ itself, have common chemical and biological properties. Vitamin $B_{12}$ and the vitamin $B_{12}$-like substances, as they will be hereinafter referred to, all apparently contain cobalt and phosphorus in a complex organic chemical combination with other elements or radicals, but their precise structural configuration is at present unknown. Vitamin $B_{12}$ itself is presumed to contain a —CN group and the vitamin $B_{12}$-like substances are believed to contain, instead of the —CN group, a hydroxyl, thiocyanate, nitrite, sulfite or other chemical radical. It is, furthermore, known that vitamin $B_{12}$ and the vitamin $B_{12}$-like substances, on the basis of their biological properties and utility, have extraordinarily high activity in minute concentrations for the alleviation of the symptoms of pernicious anemia and certain nervous disorders in humans, which latter may be attributable to the deterioration of nerve tissue by pernicious anemia. The substances also are capable of effecting a similar alleviation of symptoms of experimental anemia in rats, in promoting the growth of poultry and other farm animals, and possibly of sickly and underdeveloped children; in supplying a factor essential for the growth requirements of certain micro-organisms, such as *Lactobacillus lactis, Lactobacillus leichmanii, Escherichia coli, euglena* and many others. The term "vitamin $B_{12}$ and vitamin $B_{12}$-like substances" as employed herein and as used in the claims is intended to include all those substances which are generally regarded as belonging to the vitamin $B_{12}$ group, i. e., those which exhibit vitamin $B_{12}$ activity, irrespective of their chemical structure, and have in common the biological properties above described, and related biological properties. The generic term "cobalamins" has been proposed for the above-defined cobalt-containing vitamin $B_{12}$ and vitamin $B_{12}$-ilke substances, and said generic term, as also defined by Kaczka et al. in their article on Vitamin $B_{12}$ appearing on pages 354, 355 of "Science," September 29, 1950, vol. 112, is employed herein and in the appended claims to indicate the several different vitamin substances which may be treated by the process of the instant invention.

Although vitamin $B_{12}$ and vitamin $B_{12}$-like substances are found in many plant and animal organs, particularly in animal liver, and are frequently used in crude form, as in liver extract, the major source of these substances is from the fermentation or metabolic activity of certain micro-organisms. The extraction and purification of vitamin $B_{12}$ and vitamin $B_{12}$-like substances from their primary source in fermented liquors present extraordinary difficulties because of the many processing steps involved and the infinitesimally small yields that are ordinarily obtained. The technical literature, for example, reports a yield of not more than 1–2 micrograms per milliliter of fermented liquor, i. e., a concentration of 0.0001–0.0002%. By known procedures, this trace of product can be extracted by adsorbing agents such as fuller's earth, bentonite, activated alumina, activated charcoal, montmorillonite, absorbents and the like, or by solvents such as phenol, cresol, benzyl alcohol and related compounds. All methods known to the prior art and heretofore practiced have been subject to one or more serious disadvantages, viz., large volumes to be processed, inefficient operation, high losses and resultant high costs of processing, personnel hazard and discomfort. The art, therefore, presently lacks a relatively simple and efficient procedure for obtaining vitamin $B_{12}$ and vitamin $B_{12}$-like substances, and it is to the solution of this problem that this invention is particularly directed.

In accordance with the present invention a procedure is followed which has no relationship to the known prior art methods and which lacks the usual disadvantages thereof. The present process is predicated upon the discovery that vitamin $B_{12}$ and vitamin $B_{12}$-like substances can be simply, efficiently and inexpensively extracted from fermentation products, concentrates or other sources containing the same by the addition of a small quantity of a substituted hydroxybenzoic or a hydroxynaphthoic acid compound. Some of the substituted hydroxybenzoic and the hydroxynaphthoic acid derivatives are more effective than others, some operate best at different pH ranges and some require special conditions as will be apparent to those skilled in the art. Some are relatively expensive and others are not available in industrial quantity at the present time, and thus the compound should preferably be selected in accordance with the economics at that time. For the present, we have found that methylene disalicylic acid is the most economical and practical from the overall view, although other compounds may be more suitable in certain respects. The scope of this invention is neither to be limited to methylene disalicyclic acid nor to be construed as unqualifiedly directed to methylene disalicylic acid, but is intended to include other nuclearly substituted hydroxybenzoic and hydroxynaphthoic acid derivatives and analogs, as those terms are employed herein.

By a substituted hydroxybenzoic acid or a hydroxynaphthoic acid compound, derivative or analog is meant: hydroxynaphthoic acid and nuclearly substituted lower alkyl, such as methyl and ethyl, aryl such as phenyl, halogeno, and nitro derivatives of hydroxybenzoic and hydroxynaphthoic acids and nuclearly substituted hydroxybenzoic and hydroxynaphthoic acids formed by condensing the above-mentioned acids and their nuclear derivatives on a methylene carbon to form the methylene-bis- (hydroxybenzoic, hydroxynaphthoic or nuclearly substituted hydroxybenzoic or hydroxynpahthoic) acids. Examples of substituted hydroxybenzoic and hydroxynaphthoic acid derivatives in accordance with the foregoing definition are listed in Example 11; other examples will be understood therefrom by those versed in this art.

The addition-products of vitamin $B_{12}$ and $B_{12}$-like substances with substituted hydroxybenzoic acid or hydroxynaphthoic or derivatives precipitate from aqueous solution at an acid pH and redissolve at an alkaline pH. By the use of acetone or other suitable solvent in which vitamin $B_{12}$ and vitamin $B_{12}$-like substances are insoluble, the excess substituted hydroxybenzoic or hydroxynaphthoic acid derivatives may be dissolved and removed. After treatment with acetone or other suitable solvent, a small residual amount of the substituted hydroxybenzoic or hydroxynaphthoic derivative remains in firmer combination with vitamin $B_{12}$ and vitamin $B_{12}$-like substances. More complete separation requires cleavage with water, or preferably with hot water, and preferably, but not always, at an acid pH. By thorough extraction with water, preferably with hot water, at an acid pH, the vitamin $B_{12}$ and vitamin $B_{12}$-like substances are readily separated and removed. The cleavage may also be accomplished by extraction with solvents such as benzyl alcohol, phenols, cresol, chlorinated phenols and the like in which vitamin $B_{12}$ and vitamin $B_{12}$-like substances are soluble. The vitamin $B_{12}$ and $B_{12}$-like substances thus separated from their combination with substituted hydroxybenzoic or hydroxynaphthoic acid derivatives are found to be in a partly purified form, indicating a purifying and selective action of the substituted hydroxybenzoic or hydroxynaphthoic acid derivatives in precipitation and combination. The amount of the substituted hydroxybenzoic or hydroxynaphthoic acid compound is in the range of 0.01 to 10% for methylene disalicylic acid and molecularly proportionate amounts of other compounds.

The invention is carried out by dissolving methylene disalicylic acid or other member of the said group of compounds in the aqueous liquid or concentrate containing the vitamin $B_{12}$ and vitamin $B_{12}$-like substances under pH conditions ranging from approximately 4.0 to 10.0, preferably pH 7.0, and the resultant solution is then acidified to a pH of approximately 1.0 to 4.0, preferably pH 2.0, whereupon a precipitate containing substantially all the vitamin $B_{12}$ and vitamin $B_{12}$-like substances forms and can be readily removed from the liquid by filtration, centrifugation, and the like. Acidification is preferably effected with a mineral acid, hydrochloric acid being preferred, but any suitable acid may be employed for this purpose. The precipitate which forms is a combination of the vitamin $B_{12}$ and vitamin $B_{12}$-like substances with the substituted hydroxybenzoic or hydroxynaphthoic acid compound and can be isolated and dried as such. In those instances in which there is objection to the presence of the substituted hydroxybenzoic or hydroxynaphthoic acid compound, the excess of the latter can be readily removed by dissolving the same in a solvent, such as acetone, in which the vitamin $B_{12}$ and vitamin $B_{12}$-like substances and their addition products are insoluble. In this manner, we are able to obtain concentrated or relatively potent, sufficiently purified, vitamin $B_{12}$ and vitamin $B_{12}$-like substances of high biological activity without the disadvantages of previously known methods of recovery or isolation and in a very economical, simple and efficient manner.

As above indicated, methylene disalicylic acid is the preferred hydroxybenzoic acid compound since it is inexpensive, readily available, inoffensive and non-toxic to personnel and highly efficient in operation. The precipitate which forms after acidification is easily separated from the aqueous residue and can be dried, and, in addition, may be incorporated into animal feed supplements for consumption by domestic animals.

The invention is illustrated by the following examples without limiting the same thereto:

Example 1

To an aqueous solution at pH 7.0 containing 1.0 mg. vitamin $B_{12}$ at 10 mcgms. per ml., was added 200 mgs. of methylene disalicylic acid in the form of a solution in dilute caustic soda, and the mixture stirred. Dilute hydrochloric acid was then added with constant stirring until the pH reached 2.0. A dark red precipitate formed. The turbid solution was transferred to a test tube and centrifuged. The clear colorless supernatant liquid was decanted and discarded. The dark red precipitate was insoluble in water. Most of it dissolved when excess acetone was added, but the acetone solution remained colorless, and a very dark red residue remained in spots on the bottom of the test tube. Upon decanting and discarding the acetone solution and adding water to the test tube, the red spots dissolved instantly to yield a red solution characteristic of vitamin $B_{12}$.

Example 2

To an aqueous solution at pH 7.0 containing 2.0 mg. vitamin $B_{12}$ at 10 mcgms. per ml. was added 20 mg. of methylene disalicylic acid in the form of a solution in dilute caustic soda, and the mixture stirred. Dilute hydrochloric acid was then added with constant stirring until the pH reached 2.0. The precipitate was dissolved in ethyl alcohol and the optical absorption spectrum observed on the Beckman Spectrophotometer using methylene disalicylic acid, 20 mg. in 200 ml. of ethyl alcohol, as the blank. Absorption peaks were observed at 361, 430 and 546 mu. The identity of vitamin $B_{12}$ was established as unchanged by precipitation by the following calculation:

$$\frac{A361}{A550}=\frac{0.275}{0.080}=3.4\left(\begin{array}{c}\text{Allowed for identity of vitimin } B_{12}\\ 3.0-3.5\end{array}\right)$$

$$\frac{A550}{A430}=\frac{0.080}{0.032}=2.5\left(\begin{array}{c}\text{Allowed for identity of vitimin } B_{12}\\ 2.5-2.9\end{array}\right)$$

Using the formula of U. S. P. XIV, p. 661, the concentration of vitamin $B_{12}$ is calculated at 11.7 mcgms. per ml., corresponding to 10 mcgms. per ml. based on labeled potency, and indicating no appreciable loss or inactivation by the precipitation process.

Example 3

To a crude aqueous concentrate at pH 7.0 derived from fermentation liquors and containing 152 mcgms. of vitamin $B_{12}$ activity per ml., was added 0.1% methylene disalicylic acid and the mixture thoroughly stirred. Concentrated hydrochloric acid was then added with constant stirring to pH 2.0. The precipitate was removed and dried to yield a tan-pink powder with a vitamin $B_{12}$ activity, determined by microbiologic assay, of 6.2 mcgms. per mg.

Example 4

To 2 liters of centrifuged fermentation liquor at pH 7.0 assaying 1.20 mcgms. of vitamin $B_{12}$ activity per ml. was added 2 grams of methylene disalicylic acid. Concentrated hydrochloric acid was added with stirring to pH 2.0. The precipitate was removed, the clear supernatant liquid assayed 0.07 mcgms. of vitamin $B_{12}$ activity per ml.

Example 5

To 2 liters of filtered fermentation liquor at pH 7.0 assaying 2.8 mcgms. $B_{12}$ activity per ml. was added 2 grams of methylene disalicylic acid. Concentrated hydrochloric acid was added with stirring to pH 2.0. The precipitate was removed and the clear supernatant liquid assayed 0.12 mcgms. $B_{12}$ activity per ml. The precipitate was washed with water, with excess acetone, with ether and then dried in vacuo. The final product consisted of a tan-pink powder, 1.5 grams assaying 3.2 mcgms. $B_{12}$ activity per mg.

Example 6

To 2.7 liters of filtered fermentation liquor at pH 7.0 assaying 1.16 mcgms. $B_{12}$ activity per ml. was added 5.4 grams of methylene disalicyclic acid and 54 grams of sodium chloride. Concentrated hydrochloric acid was added with stirring to pH 2.0, the precipitate removed, washed with water and dried in vacuo. The dried powder weighed 9.0 grams. After extraction with acetone and ether and drying, a loss of 5.3 grams in weight was observed, corresponding closely to the weight of methylene disalicylic acid initially added. The 3.7 grams of tan-pink powder constituting the final product assayed 0.8 mcgms. $B_{12}$ activity per mg.

Example 7

Methylene disalicylic acid in the amount of 5 grams per liter, was used to precipitate $B_{12}$ activity from 2.93 liters of fermented liquor assaying 4.12 mcgs. $B_{12}$ per ml. The precipitate was treated with a solution of potassium cyanide, then dried in vacuo. The dry powder was extracted thoroughly with acetone, the acetone extract discarded, then the residue extracted thoroughly with hot water at pH 2.0. The aqueous extract thus obtained was neutralized with caustic soda, saturated with ammonium sulfate, extracted with benzyl alcohol and the vitamin $B_{12}$ and vitamin $B_{12}$-like substances precipitated from the benzyl alcohol extract by the addition of 5 volumes of ethyl ether. After drying, weighing and assaying, it was found that the dark red powder obtained contained 105 mcgs. $B_{12}$ activity per mg. and represented 70% of the $B_{12}$ activity originally present in the fermented liquor.

Example 8

One-half gram of the addition-product of vitamin $B_{12}$ and methylene disalicylic acid was dissolved in water by adding caustic soda to pH 7.0 and stirring. The solution was then saturated with ammonium sulfate and the whole extracted with benzyl alcohol. It was observed that the vitamin $B_{12}$ was extracted by the benzyl alcohol while the methylene disalicylic acid remained in the aqueous phase as a gummy precipitate.

Example 9

The procedure of Example 8 was repeated except that phenol replaced the benzyl alcohol, substantially the same result being obtained.

Example 10

The procedure of Example 8 was repeated except that cresol replaced benzyl alcohol, substantially the same results being obtained.

Example 11

A series of compounds were treated for their utility as a precipitating agent for vitamin $B_{12}$. In each instance, the compound was dissolved in an alkaline aqueous solution containing vitamin $B_{12}$ and the mixture acidified with hydrochloric acid until precipitation took place. Where necessary, precipitation was facilitated by cooling or other appropriate means.

The vitamin $B_{12}$ content of each of the remaining supernatant solutions was estimated by the intensity of the pink or red color. Where vitamin $B_{12}$ had been precipitated and removed from solution, the precipitate was washed with water and dried. The excess precipitating reagent was removed from the above precipitate by extraction with acetone, and then water, or sometimes hot acidified water, was added, whereupon vitamin $B_{12}$ was liberated to give the characteristic pink or red color of the vitamin. The ultra-violet spectra of the above treated extracts corresponded to that of an authentic sample of the vitamin.

The following results were obtained:

Precipitated vitamin $B_{12}$:
  5-bromosalicylic acid
  5-chlorosalicylic acid
  5-nitrosalicylic acid
  Sulfosalicylic acid
  Para-amino salicylic acid
  Methylene disalicylic acid
  3-hydroxy-2-naphthoic acid
  Methylene-bis-3-hydroxy-2-naphthoic acid
  1-hydroxy-2-naphthoic acid
  Methylene-bis-1-hydroxy-2-naphthoic acid
  3-phenyl salicylic acid
  Methylene-bis-4-hydroxybenzoic acid
  Methylene-bis-3-hydroxybenzoic acid
  5-phenylsalicylic acid
  Ortho-cresotinic acid
  Methylene-bis-ortho-cresotinic acid Did not precipitate vitamin $B_{12}$:
  Mucic acid
  Stearic acid
  Benzoic acid
  Tannic acid
  Zein
  Casein
  Boric acid The invention thus comprises a unique and highly efficacious process for obtaining, concentrating and partially purifying substances having vitamin $B_{12}$ activity from aqueous solutions or concentrates or from fermentation liquors by precipitating such substances with methylene disalicylic acid or other substituted hydroxybenzoic and hydroxynaphthoic acid compound or precipitant as herein-defined as well as to the composition or precipitate which is formed. When methylene disalicylic acid is employed in the range of 0.01 to 10% of the weight of the solution, the precipitate contains the substances of vitamin $B_{12}$ activity in the ratio of from 1:1 to 1:10,000 with relation to the methylene disalicylic acid.

Within the terms of the appended claims, various modifications may be made without departing from the invention. The invention is not to be construed as limited to the use of a single substituted hydroxybenzoic and hydroxynaphthoic acid compound since more than one may be successfully employed, if desired.

We claim:

1. A process for separating cobalamins from an aqueous liquid containing the same which comprises adding to such liquid, at a pH of about 4.0 to 10.0, a compound selected from the group consisting of hydroxynaphthoic, methylene-bis-hydroxybenzoic and methylene-bis-hydroxynaphthoic acids and nuclearly substituted lower alkyl, phenyl, halo, and nitro hydroxybenzoic, hydroxynaphthoic, methylene-bis-hydroxybenzoic and methylene-bis-hydroxynaphthoic acids, and then acidifying said liquid to a pH of about 1.0 to 4.0 by addition of mineral acid thereto to precipitate from said liquid an addition product of said cobalamins with said compound.

2. A process as defined in claim 1 wherein said mineral acid is hydrochloric acid.

3. A process for separating cobalamins from an aqueous liquid containing the same which comprises adding to such liquid, at a pH of about 7.0, a compound selected from a group consisting of hydroxynaphthoic, methylene-bis-hydroxybenzoic and methylene-bis-hydroxynaphthoic acids and nuclearly substituted lower alkyl, phenyl, halo, and nitro hydroxybenzoic, hydroxynaphthoic, methylene-bis-hydroxybenzoic and methylene-bis-hydroxynaphthoic acids and then acidifying said liquid to a pH of about 2.0 by addition of mineral acid thereto to precipitate an addition product of said cobalamins with said compound.

4. A process as defined in claim 3 wherein said mineral acid is hydrochloric acid.

5. A process for separating cobalamins from an aqueous liquid containing the same which comprises adding methylene disalicylic acid to such liquid at a pH of about 4.0 to 10.0 and then acidifying said liquid to a pH of about 1.0 to 4.0 by addition of mineral acid thereto to precipitate an addition product of said cobalamins with said methylene disalicylic acid.

6. A process as defined in claim 5 wherein said mineral acid is hydrochloric acid.

7. A process for separating cobalamins from an aqueous liquid containing the same which comprises adding methylene disalicylic acid to such liquid at a pH of about 7.0 and then acidifying said liquid to a pH of about 2.0 by addition of mineral acid thereto to precipitate an addition product of said cobalamins with said methylene disalicylic acid.

8. A process as defined in claim 7 wherein said mineral acid is hydrochloric acid.

9. A process for separating cobalamins from an aqueous liquid containing the same which comprises adding an aqueous caustic alkali solution of methylene disalicylic acid to said liquid at a pH of about 4.0 to 10.0 and then acidifying said liquid to a pH of about 1.0 to 4.0 by addition of mineral acid thereto to precipitate an addition product of said cobalamins with said methylene disalicylic acid.

10. A process as defined in claim 9 wherein said mineral acid is hydrochloric acid.

11. A process for separating cobalamins from an aqueous liquid containing the same which comprises adding methylene disalicylic acid to such liquid at a pH of about 4.0 to 10.0 and then acidifying said liquid to a pH of about 1.0 to 4.0 by addition of mineral acid thereto to precipitate an addition product of said cobalamins with said methylene disalicylic acid, and then treating the said precipitate with an aqueous solution of potassium cyanide and drying under vacuum.

12. The addition product of a cobalamin with a compound selected from the group consisting of hydroxynaphthoic, methylene-bis-hydroxy-benzoic and methylene-bis-hydroxynaphthoic acids and nuclearly substituted lower alkyl, phenyl, halo, and nitro hydroxybenzoic, hydroxynaphthoic, methylene-bis-hydroxybenzoic and methylene-bis-hydroxynaphthoic acids.

13. The addition product of a cobalamin with a methylene-bis hydroxybenzoic acid compound.

14. The addition product of a cobalamin with methylene disalicylic acid.

15. A process for separating cobalamins from an aqueous liquid containing the same which comprises adding to such liquid, at a pH of about 4.0 to 10.0, a methylene-bis-hydroxy aromatic monocarboxylic acid compound, and then acidifying said liquid to a pH of about 1.0 to 4.0 by addition of a mineral acid thereto to precipitate from said liquid an addition product of said cobalamins with said compound.

16. A process as defined in claim 15 wherein said mineral acid is hydrochloric acid.

17. A process for separating cobalamins from an aqueous liquid containing the same which comprises adding to such liquid, at a pH of about 7.0, a methylene-bis-hydroxyaromatic monocarboxylic acid compound, and then acidifying said liquid to a pH of about 2.0 by addition of a mineral acid thereto to precipitate an addition product of said cobalamins with said compound.

18. A process as defined in claim 17 wherein said mineral acid is hydrochloric acid.

19. The addition product of a cobalamin with a methylene-bis-hydroxyaromatic monocarboxylic acid compound.

20. A process for separating cobalamins from an aqueous liquid containing the same which comprises adding to such liquid, at a pH of about 4.0 to 10.0, a compound selected from the group consisting of hydroxynaphthoic, methylene-bis-hydroxybenzoic and methylene-bis-hydroxynaphthoic acids and nuclearly substituted lower alkyl, phenyl, halo, and nitro hydroxybenzoic, hydroxynaphthoic, methylene-bis-hydroxybenzoic and methylene-bis-hydroxynaphthoic acids, and then acidifying said liquid to a pH of about 1.0 to 4.0 by addition of a mineral acid thereto to precipitate from said liquid an addition product of said cobalamins with said compound, and then removing the excess of said compound from the precipitate by extraction with a solvent in which said cobalamins and said addition products are insoluble.

21. A process as defined in claim 20 in which said solvent is acetone.

22. A process for separating cobalamins from an aqueous liquid containing the same which comprises addition to such liquid, at a pH of about 4.0 to 10.0, a compound selected from the group consisting of hydroxynaphthoic, methylene-bis-hydroxybenzoic and methylene-bis-hydroxynaphthoic acids and nuclearly substituted lower alkyl, phenyl, halo, and nitro hydroxybenzoic, hydroxynaphthoic, methylene-bis-hydroxybenzoic and methylene-bis-hydroxynaphthoic acids, acidifying said liquid to a pH of about 1.0 to 4.0 by addition of a mineral acid thereto to precipitate from said liquid an addition product of said cobalamins with said compound, removing the excess of said compound from the precipitate by extraction with a solvent in which said cobalamins and said addition product are insoluble, and then extracting the cobalamins from said precipitate by treatment with a member of the group consisting of water and organic solvents for said cobalamins.

23. A process for separating cobalamins from an aqueous liquid containing the same which comprises adding to such liquid, at a pH of about 4.0 to 10.0, a compound selected from the group consisting of hydroxynaphthoic, methylene-bis-hydroxybenzoic and methylene-bis-hydroxynaphthoic acids and nuclearly substituted lower alkyl, phenyl, halo, and nitro hydroxybenzoic, hydroxynaphthoic, methylene-bis-hydroxybenzoic and methylene-bis-hydroxynaphthoic acids, acidifying said liquid to a pH of about 1.0 to 4.0 by addition of a mineral acid thereto to precipitate from said liquid an addition product of said cobalamins with said compound, removing the excess of said compound from the precipitate by extraction with a solvent in which said cobalamins and said addition product are insoluble, and then extracting the cobalamins from said precipitate by dissolving said precipitate with aqueous caustic soda and extracting the cobalamins from the resulting solution by treatment with a water immiscible organic solvent for said cobalamins.

24. A process as defined in claim 23 wherein the cobalamins are extracted from said resulting solution by treatment with benzyl alcohol.

25. A process as defined in claim 23 wherein the cobalamins are extracted from said resulting solution by treatment with phenol.

26. A process as defined in claim 23 wherein the cobalamins are extracted from said resulting solution by treatment with cresol.

References Cited in the file of this patent

UNITED STATES PATENTS

| | | |
|---|---|---|
| 2,530,416 | Wolf | Nov. 21, 1950 |
| 2,678,297 | McCormick | May 11, 1954 |
| 2,745,787 | McCormick | May 15, 1956 |

OTHER REFERENCES

Simonoff: Antibiotics Annual, 1953–54 (December 1953), p. 395.

Buhs: Science, vol. 113, June 1, 1951, pp. 625 and 626.

Smith: Biochem. Jour. (Proceedings of the Biochem. Soc.), vol. 48, April 1951, pp. L and LI.